United States Patent [19]

Sandel et al.

[11] Patent Number: 4,469,207
[45] Date of Patent: Sep. 4, 1984

[54] GEAR CHANGE ACTUATORS

[75] Inventors: Robert J. Sandel, St. Johns; Samuel F. Ward, Fernhill Heath, both of England

[73] Assignee: Froude Engineering Ltd., England

[21] Appl. No.: 333,381

[22] Filed: Dec. 22, 1981

[30] Foreign Application Priority Data

Dec. 29, 1980 [GB] United Kingdom ............... 8041366

[51] Int. Cl.³ .............................................. B60K 41/22
[52] U.S. Cl. .................................. 192/3.58; 73/117.3;
74/473 R; 92/76; 192/3.57
[58] Field of Search ................ 192/0.073, 0.076, 3.58,
192/3.57; 74/473 R; 92/23, 61, 76; 73/117,
117.3

[56] References Cited

U.S. PATENT DOCUMENTS

| | | | |
|---|---|---|---|
| 3,103,826 | 9/1963 | Jaeschke | 192/3.58 |
| 3,628,642 | 12/1971 | Ravenel | 192/0.073 |
| 4,294,341 | 10/1981 | Swart | 192/0.076 |

FOREIGN PATENT DOCUMENTS

| | | |
|---|---|---|
| 1015167 | 8/1962 | United Kingdom . |
| 1076315 | 9/1964 | United Kingdom . |
| 1538954 | 6/1976 | United Kingdom . |

*Primary Examiner*—George H. Krizmanich
*Assistant Examiner*—M. Manley
*Attorney, Agent, or Firm*—Leydig, Voit, Osann, Mayer and Holt, Ltd.

[57] ABSTRACT

A gear lever actuator is provided for remotely or automatically moving the gear lever of a gearbox connected to an engine to be tested. The gear lever actuator comprises a first actuator for moving the gear lever between a neutral plane and gear selecting positions on either side of the neutral plane. Movable jaws are provided for clamping the gear lever during gear changing and for disengaging the gear lever when the engine and gearbox are running under load. The gear lever is then free to jump out of gear upon the occurrence of a fault, thus preventing damage to the gearbox.

5 Claims, 5 Drawing Figures

GEAR CHANGE ACTUATORS

The present invention relates to gear change actuators Such an actuator may be used to actuate gear changing remotely or automatically by moving the gear lever of a gearbox connected to an internal combustion engine.

According to the invention, there is provided a gear change actuator comprising a first actuator means for moving a gear lever between a neutral position and a gear selecting position, and clamping means for selectively engaging and disengaging the gear lever with the first actuator means.

Preferably, the first actuator means is arranged to move the gear lever selectively between a central neutral position and gear selecting positions on respective opposite sides of the neutral position. Preferably, there is provided a second actuator means for moving the gear lever transversely to the direction of movement provided by the first actuator means. In conventional automotive gearboxes, for instance having four or five forward gears and one reverse gear, the gear selection positions of the gear lever are disposed in the well-known H or double-H configuration with the central bar defining a neutral plane. By actuating the first and second actuator means in the appropriate sequence, the gear change actuator can change gear between any selected pair of gears. During gear changing, the clamping means engages the gear lever with the first actuator means so that the gear lever is constrained, within limits, to follow the movement of the first actuator means. When the desired gear has been selected, the clamping means is disengaged so that the gear lever is free to jump out of gear and back to the neutral position or plane or to any other position along the Y-axis upon the occurence of a fault. Thus, damage to the gearbox in the event of such a fault is prevented.

Preferably, the second actuator means comprises an hydraulic or pneumatic piston and cylinder, with the cylinder mounted on a fixed support and the piston connected to a slidably mounted carriage carrying the first actuator means. Preferably, the first actuator means comprises an hydraulic or pneumatic cylinder and piston with the cylinder fixed to the carriage and the piston connected to the clamping means for movement perpendicularly to the sliding direction of the carriage. Preferably, the clamping means comprises a block fixedly connected to the piston of the first actuator means and first and second jaws connected to a pneumatic or hydraulic cylinder and piston, respectively, for sliding movement towards and away from the block in a direction substantially parallel to the direction of movement of the block by the first actuator means. Preferably, a clutch actuating means is provided, for instance in the form of a power-operated piston and cylinder. The clutch actuating means may be arranged to engage and disengage the clutch when the clamping means disengages and engages the gear lever, respectively.

Thus, in order to move the gear lever from a neutral position or from a previously selected gear position to a desired gear selection position, the clamping means engages the gear lever while the clutch actuating means simultaneously disengages the clutch. Then, if necessary, the first actuator means returns the gear lever to the neutral plane. If necessary, the second actuator means moves the gear lever in the neutral plane to a transverse plane containing the desired gear selection position. The first actuator means then moves the gear lever to the desired gear selection position. Finally, the clamping means disengages the gear lever and the clutch actuating means simultaneously engages the clutch.

Preferably, the block is connected to the first actuator piston via a clevis pin load cell for monitoring the force applied to the gear lever during gear selection.

Preferably, the first jaw is spring loaded and includes a spring loaded side lever to provide an expanding grip on the gear lever.

Preferably, the first and second jaws have tapered clamping faces to allow for the change in gear lever inclination when moved transversely to the neutral plane.

The invention will be further described, by way of example, with reference to the accompanying drawings, in which.

Figure 1:
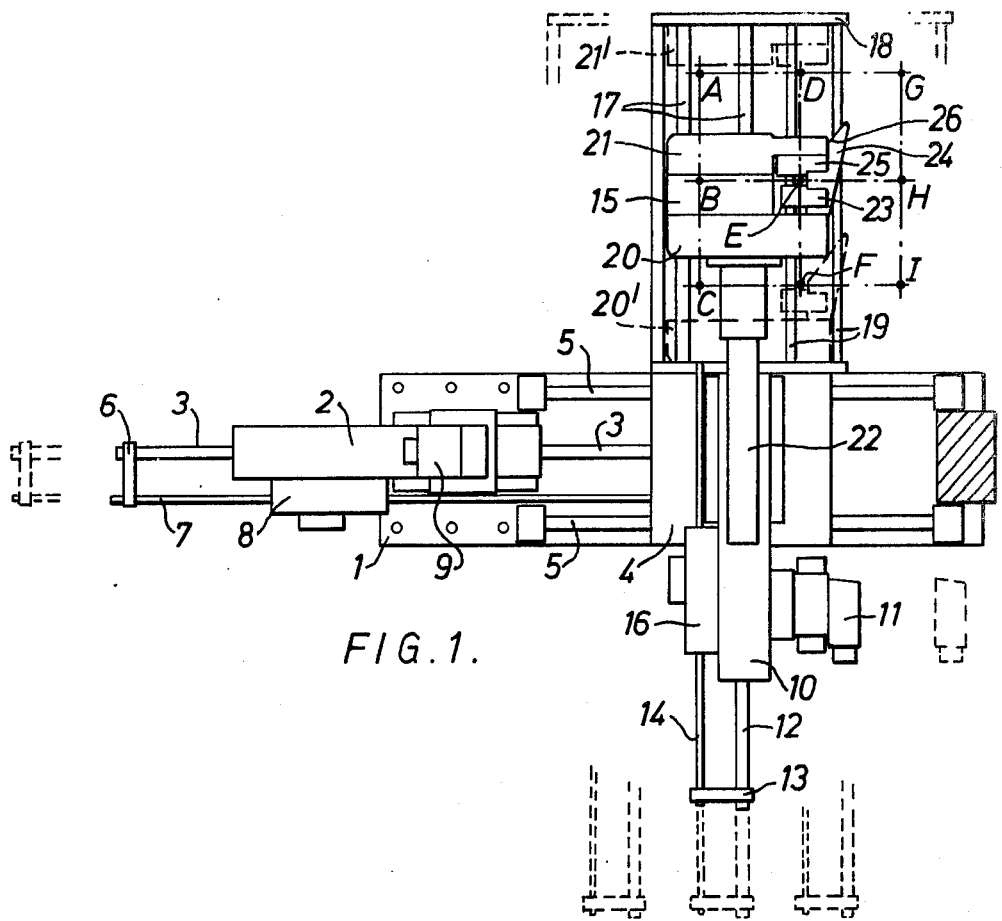
FIG. 1 is a plan view of a gear change actuator constituting a preferred embodiment of the invention.
Figure 2:
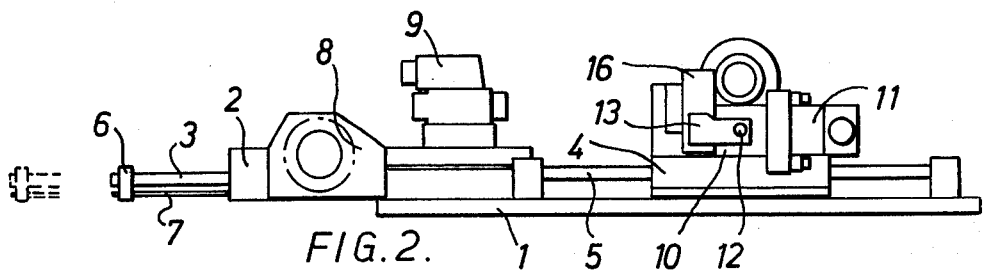
FIG. 2 is a side view of the gear change actuator of FIG. 1.

The accompanying drawings show a gear-change actuator which may be used for remotely or automatically changing gear with a conventional gear-box attached to an internal combustion engine. The actuator may be used, for instance, in the cab of a lorry if the engine and gear-box are to be tested when installed in the vehicle, or may be attached to the gear-box when the engine and gear-box are mounted in a test stand for connection for instance to a dynamometer.

The gear change actuator comprises a mounting plate 1 provided with a plurality of holes to allow it to be mounted to the vehicle or to the gear-box. A cylinder 2 of an hydraulic or pneumatic piston and cylinder arrangement is fixed to the support plate 1 and has a piston connected via a piston rod 3 to a carriage 4 which is slidably mounted on slide bearings to a pair of slide bars 5. At its other end, the piston rod 3 is connected via a cross-member 6 to a chain 7, which is fixed at its other end to the carriage 4. The chain passes around a cog-wheel (not shown) attached to the spindle of a rotary single 360° turn potentiometer 8. Alternatively, a linear potentiometer or a linear variable displacement transformer may be used. The output signal of the rotary potentiometer 8 thus provides an indication of the position of the carriage 4 with respect to the support plate 1.

The hydraulic or pneumatic cylinder 2 and piston is connected via a servo valve 9 to a source of hydraulic fluid or air for operating the piston and cylinder. The servo valve 9, the hydraulic cylinder 2 and piston the rotary potentiometer 8, and the source of hydraulic fluid or air thus form part of a servo system for controlling the position and speed of movement of the carriage 4.

The carriage 4 supports a cylinder 10 of another hydraulic or pneumatic cylinder and piston arrangement also provided with a servo valve 11. The piston of the cylinder 10 and piston arrangement is connected to a rod 12 which is connected at one end via a cross-member 13 to a chain 14 whose other end is connected to a central block 15 mounted at the other end of the piston rod 12. The chain passes over a cogwheel of a rotary single 360° turn potentiometer 16. Alternatively, a linear potentiometer or a linear variable displacement transformer may be used. Thus, the cylinder and piston arrangement, the servo valve 11, the chain 14, and the rotary potentiometer 16 form part of another servo system for controlling the position and speed of movement of the central block 15.

The central block 15 is attached to the piston rod 12 via a clevis pin load cell, which allows the force exerted on a gear lever to be monitored. The slide block 15 is slidable by means of sliding bearings on slide bars 17, which are rigidly connected at their first ends to the carriage 4 and at their second ends to a cross-member 18. The cross-member 18 and the carriage 4 are further interconnected by guide shafts 19.

First and second blocks 20 and 21, respectively, are slidably mounted on the slide bars and on one of the guide shafts on either side of the central block 15. The first and second blocks 20 and 21 are fixed to a cylinder 22 and piston of a pneumatic or hydraulic cylinder and piston arrangement. In particular, the second block 21 is connected to the piston via a rod which passes slidably through the central block 15 and the first block 20. The first block 20 carries a spring-loaded jaw 23, which is biased towards the second block 21, and a spring-loaded side lever 24 which is biased towards the central block 15. The second block 21 carries a fixed jaw 25. The side lever 24 has an inclined face 26 for assisting in engaging a gear lever and the spring loading of the jaw 23 and the side lever 24 provides an expansion connection for engaging with the gear lever.

Figure 3:
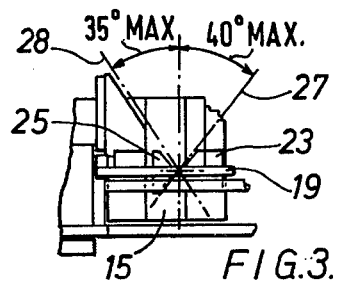
FIG. 3 is a part view in the direction of arrow AA in FIG. 1.

As shown in FIG. 3, the jaws 23 and 25 have tapered surfaces which face each other. Tapering of the surfaces is such that the jaws accommodate the different inclinations of a gear lever as it is moved between gear selecting positions on opposite sides of the neutral plane. The extreme inclinations of a gear lever which can be accommodated are shown by the lines 27 and 28 in FIG. 3.

Figure 4:
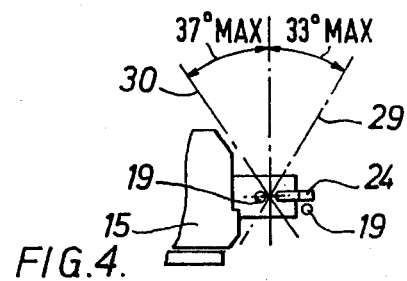
FIG. 4 is a part-sectional view on the line B-B of FIG. 3.

As shown in FIG. 4, the gear lever is accommodated when changing gear, between one of the slide bars 19 and the side lever 26. The thicknesses and relative positions of the guide rod 19 and the lever 24 are such that different inclinations of the gear lever at extreme ends of the neutral plane and in gear selecting positions in planes transversely of these extreme ends can be accommodated. The lines 29 and 30 in FIG. 4 indicate the extreme inclinations of the gear lever which may be accommodated.

The gear change actuator shown in the accompanying drawings may be used with conventional gear-boxes of cars or lorries in which the gear selecting positions are disposed in an H configuration with the central bar defining a neutral plane. Such a configuration is generally referred to as a H or double-H gate. The gear change actuator shown in FIG. 1 is capable of actuating gear changes in a double-H gate providing for up to 5 forward gears and one reverse gear or 6 forward gears neglecting the reverse gear (if any). FIG. 1 illustrates the envelope of gear lever movements for such a double-H gate, with a nominal neutral plane being defined by a plane passing through the positions B, E and H perpendicularly to the drawing. Extremes of gear selecting positions are shown at A, D, G, C, F and I.

The gear change actuator may be used in combination with a clutch actuator, such as a pneumatic or hydraulic piston and cylinder arrangement. The clutch actuator may advantageously be operated simultaneously with the pneumatic or hydraulic cylinder 22 and piston arrangement, for instance by a common solenoid valve. There may further be provided throttle actuator means for actuating the engine throttle or fuel control. A clutch actuator and the throttle actuating means may similarly be arranged to operate the pedals of a vehicle if the engine and gearbox are being tested insitu, or may operate directly on clutch and accelerator levers of the engine when the engine and gear-box are mounted on a test stand for coupling to a dynamometer.

Figure 5:
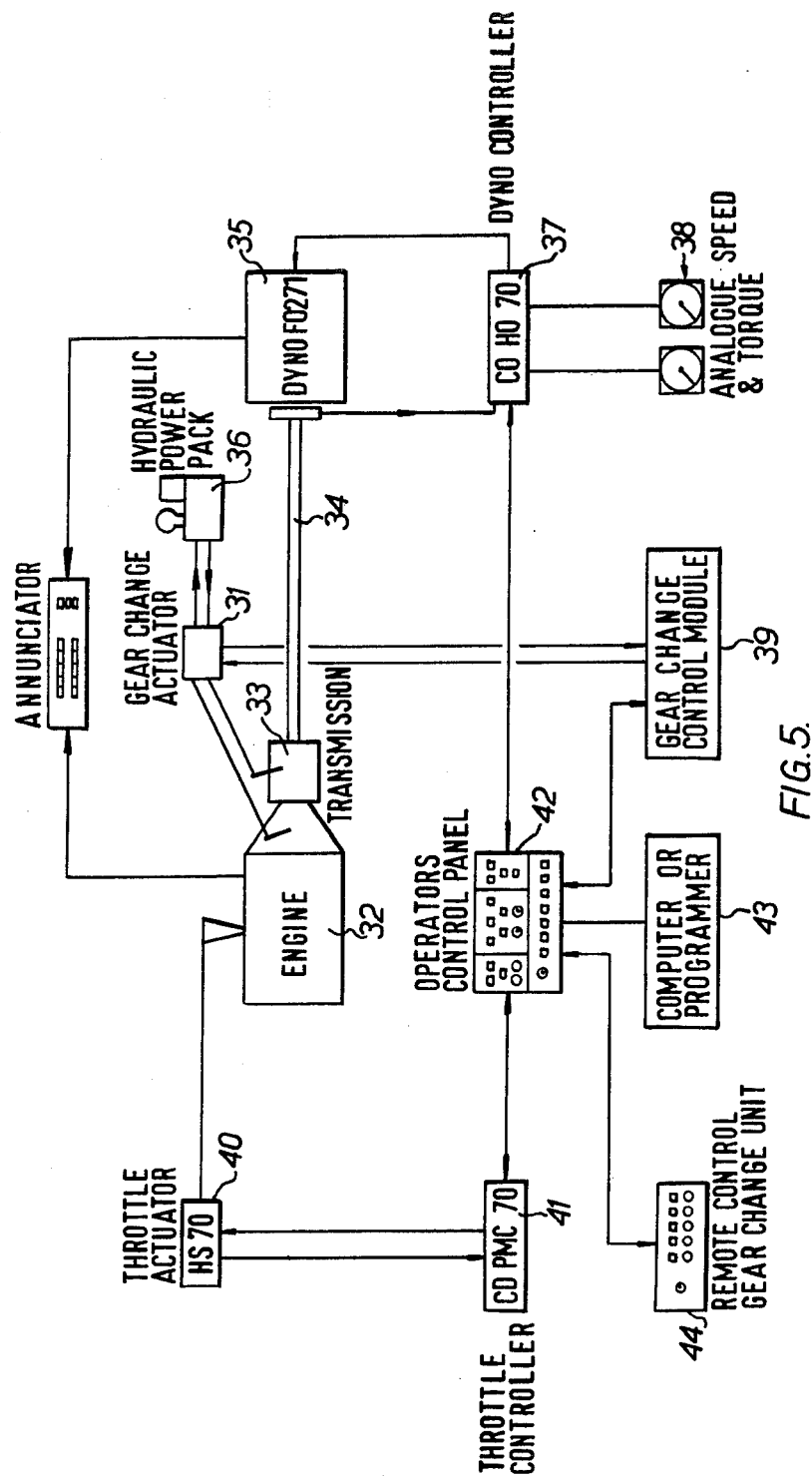
FIG. 5 is a diagram of an engine testing arrangement including the gear change actuator of FIG. 1.

FIG. 5 illustrates use of the gear change actuator 31 of the type shown in FIGS. 1 to 4 and including a clutch actuator. As shown in FIG. 5, an internal combustion engine 32 and gear transmission 33 mounted on a test stand (not shown) are connected via a coupling shaft 34 to a dynamometer 35. The gear change actuator is connected to a hydraulic power pack 36. The dynamometer 35 is connected to a dynamometer controller 37 provided with analogue and/or digital indicators 38 of, for instance, speed and torque. The gear change actuator 31 is connected to a gear change control module 39. The engine 32 is further provided with a throttle actuator 40 connected to a throttle controller 41.

The dynamometer controller 37, the gear change control module 39, and the throttle controller 41 are connected to an operator control panel 42 for control of testing of the engine 32 and transmission 33. The control panel 42 is connected to a computer or programmer 43 for automatic control of testing. The control panel is also connected to a remote control gear change unit 44 which can be used for setting up the gear change actuator 31 when the engine and transmission are being prepared for testing.

During testing of the engine 32 and transmission 33, it is necessary from time to time for the gear change actuator 31 to change gear. The gear change actuator shown in FIGS. 1 to 4 of the drawings performs such gear changing as follows. Assuming that the gear lever is initially in position A, which might for instance correspond to first gear, then until it is required to change from this gear, the first and second blocks 20 and 21 are maintained in the positions shown in dashed lines at 20' and 21', respectively, by the pneumatic or hydraulic cylinder 22 and piston arrangement. When the gear change control module 39 receives an instruction from the control panel 42, for instance from the computer 43 or from the remote control gear change unit 44, it first actuates the pneumatic or hydraulic cylinder 22 and piston arrangement so that the blocks 20 and 21 are clamped together against the central block 15. The block 15 will have been in position to the left of the gear position A as a result of a previous selection of this gear. Simultaneously, the clutch actuator disengages the clutch so as to permit gear changing. The clamping of the first and second blocks 20 and 21 to the central block 15 causes the gear lever to be clamped between the jaws 23 and 25 and between one of the slide bars 19 and the side lever 24.

The hydraulic or pneumatic cylinder 10 and piston arrangement is then actuated by the servo valve 11 to move the central block 15 and the first and second blocks 20 and 21 clamped thereto, downwardly so that the gear lever assumes the position B in the neutral plane. The rotary potentiometer 16, in corporation with the chain 14, supplies positional feed back signals to the gear change control module 39, which controls the servo valve 11 to provide a servo feed back arrangement to control both position and speed of movement of the block 15.

Assuming that it is desired to select a gear corresponding to the position F shown in FIG. 1, the hydraulic or pneumatic cylinder and piston arrangement mounted on the support plate 1 is then actuated by the servo valve 9, which is controlled by the gear change control module 39. The cylinder 2 and piston arrangement thus moves the carriage 4 to the right in FIG. 1 until the gear lever is at the position E, this arrangement of the apparatus being shown in solid lines in FIG. 1. Again, the rotary potentiometer 8 supplies feed-back signals to the gear change control module 39 so that the position and speed of movement of the carriage 4 can be controlled. The hydraulic or pneumatic cylinder 10 and piston arrangement is then again actuated to move the gear-lever downwardly to the position F shown in FIG. 1 for selection of the desired gear. Finally, the pneumatic of hydraulic cylinder 22 and piston arrangement is again actuated to separate the first and second block 20 and 21 and to move them to the positions shown at 20' and 21', respectively in FIG. 1. The clutch is simultaneously re-engaged by the clutch actuator.

During the gear changing operation, the throttle actuator 40 is controlled by the controller 41 upon receiving signals from the control panel 42 so as to return the throttle to its idle position while the clutch is disengaged. As the clutch re-engages, the throttle actuator 40 is controlled so as to open the throttle to a desired setting for continued testing under power of the engine and transmission. It may also be necessary, for certain tests, for the dynamometer load on the engine and transmission to be reduced to a minimum during gear changing. If this is required, then the control panel 42 causes the dynamometer controller 37 to reduce the load provided by the dynamometer 35 to a minimum during the gear changing.

Thus, whenever the transmission is running under power from the engine and is loaded by the dynamometer 35, the gear lever is released by the gear change actuator so that, if a fault develops in the transmission, then the gear lever can jump out of gear and return to the neutral plane or any other position along the Y-axis so that no further damage to the gearbox is done. In this respect, the gear lever is only positively engaged by the gear change actuator when the clutch is disengaged. The gear change actuator thus reduces the possibility of damage to a transmission during testing. A device (not shown) is fitted to the blade 15 for detecting movement of the gear lever away from a position adjacent the block 15. Thus, a signal is sent to the control panel 42 when the gear lever jumps out of gear. When this occurs, a control system causes the engine and dynamometer to come to rest and an alarm to be operated. Thus, an indication is provided of when the mechanism or wear within the gearbox allows the gear lever to jump out of gear.

We claim:

1. A gear box change actuator for actuating selection of gears by a gear box, said gear change actuator comprising first actuator means for moving a gear lever of the gear box between a neutral position and a gear selection position, and clamping means for selectively engaging and disengaging the gear lever with said first actuator means, said first actuator means being arranged to move the gear lever selectively between a central neutral position with respect to the gear box and gear selecting positions on respective opposite sides of said central neutral position, a fixed support, a slidably mounted carriage and second actuator means for moving the gear lever transversely to the direction of movement provided by said first actuator means, said second actuator means comprising a fluid-operated piston and cylinder, said cylinder being mounted on said fixed support and said piston being connected to said slidably mounted carriage, said slidably mounted carriage carrying said first actuator means.

2. A gear change actuator as set forth in claim 1, said first actuator means comprising a further fluid-operated cylinder and piston, said further cylinder being fixed to said carriage and said further piston being connected to move said clamping means perpendicular to the sliding direction of said carriage.

3. A gear change actuator as set forth in claim 2, said clamping means comprising a block fixed to said piston of said first actuator means, and first and second jaws connected to a further fluid-operated cylinder and piston, respectively, for sliding movement in a direction substantially parallel to the direction of movement of said block by said first actuator means.

4. A gear change actuator as set forht in claim 3, wherein said first jaw includes a spring loaded side lever arranged to provide an expanding grip for the gear lever.

5. A gear change actuator as set forth in claim 3, wehrein said first and second jaws have tapered clamping faces to accommodate changes in inclination of the gear lever.

* * * * *